United States Patent
Larson et al.

(10) Patent No.: US 10,364,400 B2
(45) Date of Patent: *Jul. 30, 2019

(54) SPENT GRAIN FUEL PRODUCT AND PROCESS

(71) Applicant: AKBEV GROUP, LLC, Juneau, AK (US)

(72) Inventors: Geoffrey L. Larson, Juneau, AK (US); Curtis Holmes, Juneau, AK (US); Brandon Michael Smith, Chico, CA (US); David D. Wilson, Juneau, AK (US)

(73) Assignee: AKBEV GROUP, LLC, Juneau, AK (US)

(*) Notice: Subject to any disclaimer, the term of this patent is extended or adjusted under 35 U.S.C. 154(b) by 799 days.

This patent is subject to a terminal disclaimer.

(21) Appl. No.: 14/756,904

(22) Filed: Oct. 28, 2015

(65) Prior Publication Data

US 2017/0121619 A1  May 4, 2017
US 2017/0247623 A9  Aug. 31, 2017

Related U.S. Application Data

(63) Continuation-in-part of application No. 13/199,505, filed on Sep. 1, 2011, now Pat. No. 9,447,354.

(51) Int. Cl.
*C10L 5/44* (2006.01)
*C10L 9/00* (2006.01)
(Continued)

(52) U.S. Cl.
CPC .............. *C10L 5/44* (2013.01); *C10L 5/366* (2013.01); *C10L 5/42* (2013.01); *C10L 5/445* (2013.01);
(Continued)

(58) Field of Classification Search
CPC ............ C10L 2290/02; C10L 2290/08; C10L 2290/28; F23K 2201/10; F23K 2201/101; F23K 2201/20; C12C 1/00
See application file for complete search history.

(56) References Cited

U.S. PATENT DOCUMENTS 2,494,544 A    1/1950  Erlich
2,925,055 A *  2/1960  Miller ...................... F23B 1/00
                                                       110/105
(Continued)

FOREIGN PATENT DOCUMENTS

EP       2136138 A2 * 12/2009  ............... F23G 5/30
JP    2001241848 A  *  9/2001
(Continued)

OTHER PUBLICATIONS

Machine Translation of JP-2001241848-A (Year: 2001).*
(Continued)

*Primary Examiner* — Ellen M McAvoy
*Assistant Examiner* — Ming Cheung Po
(74) *Attorney, Agent, or Firm* — Emerson, Thomson & Bennett, LLC; Roger D. Emerson

(57) ABSTRACT

A process of making a fuel product from spent grain from a beer brewing process. In the brewing process, the grain is pulverized to a particle size whose mean particle size is approximately 0.25 mm to 0.6 mm with less than 1% greater than 2 mm. After the brewing sugars are extracted from the grain, the spent grain is pressed against a filter to reduce moisture below sixty-five percent (65%), and then the grain is dried to further reduce its moisture to less than ten percent (10%). The dried spent grain, after the aforementioned processing, is fed into a combustion chamber for a steam boiler that is used for beer brewing, and the spent grain is
(Continued)

separated during combustion by agitation such as spraying of the grain in the combustion chamber.

12 Claims, 1 Drawing Sheet

(51) Int. Cl.
  *C12C 1/00* (2006.01)
  *C10L 5/36* (2006.01)
  *F23B 30/00* (2006.01)
  *C10L 5/42* (2006.01)

(52) U.S. Cl.
  CPC ...................... *C10L 9/00* (2013.01); *F23B 1/02* (2013.01); *C10L 2200/0469* (2013.01); *C10L 2250/06* (2013.01); *C10L 2290/06* (2013.01); *C10L 2290/08* (2013.01); *C10L 2290/145* (2013.01); *C10L 2290/18* (2013.01); *C10L 2290/24* (2013.01); *C10L 2290/28* (2013.01); *C10L 2290/30* (2013.01); *C10L 2290/544* (2013.01); *C10L 2290/547* (2013.01); *Y02E 50/10* (2013.01); *Y02E 50/30* (2013.01)

(56) References Cited

U.S. PATENT DOCUMENTS

| | | | |
|---|---|---|---|
| 4,290,269 A | 9/1981 | Hedstrom et al. | |
| 4,464,402 A | 8/1984 | Gannon | |
| 5,536,650 A | 7/1996 | Versteegh | |
| 5,637,336 A | 6/1997 | Kannenberg et al. | |
| 6,167,636 B1 | 1/2001 | Kepplinger et al. | |
| 2005/0166811 A1 | 8/2005 | Alexakis et al. | |
| 2013/0055622 A1 | 3/2013 | Larson et al. | |
| 2013/0091761 A1 | 4/2013 | Willner | |
| 2014/0352854 A1 | 12/2014 | White et al. | |

FOREIGN PATENT DOCUMENTS

| | | | | |
|---|---|---|---|---|
| PT | 104494 | | 8/2009 | |
| PT | 104494 B | | 3/2010 | |
| WO | WO1998022751 A1 | * | 5/1998 | |
| WO | WO-2009049385 A1 | * | 4/2009 | .............. C12C 5/00 |
| WO | 2010117288 | | 10/2010 | |
| WO | WO-2010117288 A1 | * | 10/2010 | ........... B01D 25/007 |

OTHER PUBLICATIONS

International Search Report and Written Opinion for corresponding International (PCT) Application No. PCT/US2016/059528 filed on Oct. 28, 2016.
Sky News Article dated Feb. 1, 2010, Author Gerard Tubb, Entitled "Heineken Forced to Con Green Power Plants", 2 pages, copyright 2011 BSKYB. 2 Page.
Nartsila Corp. Press Release Mar. 3, 2008. Entitled Wartsila delivers Worlds first Bro Power plant using brewery Spent Grain . . . .COPYRGT. 2010 Wartsila.
McCabe, John T. "The Practical Brewer", Amer. Assn. Of Cereal Chemists; 3rd Edition (Apr. 1, 1999).
Trageser, Claire. "What do Craft Brewers Do With Some of Their Waste? Feed it to the Cows", published Apr. 9, 2018. https://www.kpbs.org/news/2018/apr/09/what-do-craft-brewers-do-some-their-waste-feed . . . .
Spengler, Jessica. "Using Spent Grain Responsibly". https://beveragemaster.com/article/using-spent-grain-responsibly/ (Jan. 31, 2017).
Kurzrock, Dan. "What Usually Happens to Brewers' "Spent" Grain?" https://www.regrained.com/blogs/upcyclist/what-usually-happens-to-brewers-spent-grain (Jun. 13, 2017).
Fuller, Janet Rausa. "Boom in Breweries leads to Growing Problem: What to do With Spent Grain?" https://www.dnainfo.com/chicago/20141020/chicago/boom-breweries-leads-growing-pro . . . (Oct. 20, 2014).
Mitchell Dushay & Phil Lewis. "Business Study of Alternative Uses for Brewers' Spent Grain" Final Project Report (Apr. 28, 2011).
Brewers Association Solid Waste Reduction Manual (Mar. 25, 2013).
Zebell, Lorenza, et al. "Spent Grain Creative Waste Solutions". (May 16, 2016).
Lynch, Kieran M., et al. "Brewers' Spent Grain: A Review with an Emphasis on Food and Health" https://onlinelibrary.wiley.com/doi/full/10.1002/jib.363 (Oct. 28, 2016).
Weger, Andreas, et al. "Solid Biofuel Production by Mechanical Pre-Treatment of Brewers' Spent Grain", The Italian Association of Chemical Engineering (Apr. 19, 2014).
Greer, Diane. "Feeding it Back", http://biomassmagazine.com/articles/1735/feeding-it-back (Jun. 20, 2008).
"Spent Grain Burns into Clean Energy" http://www.energy-enviro.com/demo47/index.php?PAGE=1863&PRINT=yes (Jun. 17, 2008).
Beharry, Lyndon Martin W. "MCS-APB Tiger Brewery Brewers Spent Grains Question" https://www.slideshare.net/LMBehany/2015-0913-mcsapbspentgrains (Sep. 11, 2015).

* cited by examiner

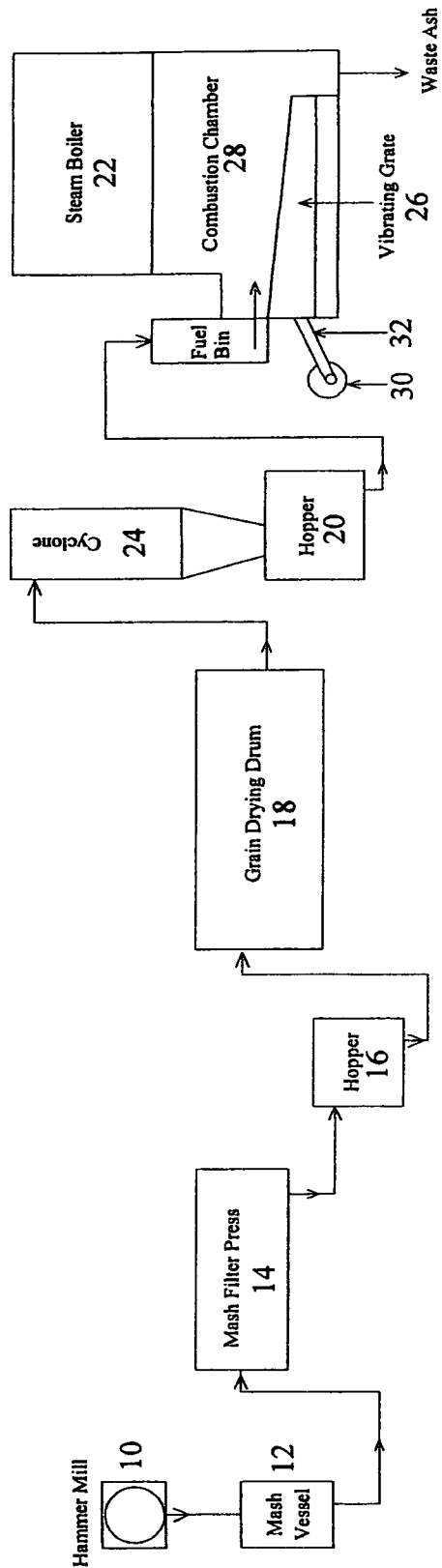

SPENT GRAIN FUEL PRODUCT AND PROCESS

The present application is a continuation in part of our pending U.S. application, Ser. No. 13/199,505 filed Sep. 1, 2011.

The present invention generally relates to a fuel product made from grain, preferably spent grain such as that which is a byproduct of brewing. In addition, the present invention relates to a novel and improved process for making a fuel product from spent grain. The present invention also relates to the novel use of such a fuel product of spent grain as a primary fuel for a steam boiler in a brewing process.

BACKGROUND OF PRESENT INVENTION

Spent grain from the brewing of alcoholic products has been used as a food product such as cattle feed. In some of the processes used to make the food product it is known to reduce the moisture content of the spent grain through press and/or drying operations. Although there have been some attempts to use spent grain as a major part of the fuel used for a steam boiler, such attempts have been unsuccessful due to insufficient or failure of combustion and excessive smoke produced thereby. Although there have been successful attempts to use spent grain as a minor part of the fuel for a steam boiler, attempts to use spent grain as the sole or primary fuel have been unsuccessful due to insufficient or failure of combustion and excessive smoke produced thereby.

OBJECTS OF THE PRESENT INVENTION

A primary object of the present invention is to provide a novel fuel product made from spent grain and a novel and improved process for making this fuel product. Included herein is such a fuel product that can be used in a steam boiler or other fireboxes in conformance with present day environmental and emission laws and regulations. Further included herein is such a fuel product that can be successfully used as the sole or primary fuel for a steam boiler used such as in brewing.

A further object of the present invention is to provide a novel and improved process for making a fuel product from spent grain using machines or devices that are commercially available in industry.

Another object of the present invention is to provide heat for a brewing process using a steam boiler fueled by a novel fuel product made from the spent grain byproduct of the brewing process.

SUMMARY OF A PREFERRED FORM OF THE PRESENT INVENTION

In one preferred form of the present invention, a fuel product is made from the spent grain byproduct of a process for brewing beer from malt and other grains. During or after the brewing process, the spent grain is processed to sufficiently reduce its median particle size to preferably 0.25 mm to 0.6 mm with less than 1% of the grain greater than 2 mm. The wet spent grain is pressed on a mash filter press to reduce moisture below sixty-five percent (65%) and reduce soluble sugars and proteins. No longer needed for brewing, the spent grain is next dried to reduce its moisture content to ten percent (10%) or less by weight. The spent grain is then moved downward through a combustion chamber of a steam boiler and is agitated or vibrated during its combustion to further break up the structure of the burning spent grain thereby preventing the formation of a solid mass of spent grain which will prevent sufficient combustion.

DRAWING

Other objects and advantages of the present invention will become apparent from the following detailed description taken in conjunction with the attached drawing which is a schematic flow diagram of a preferred process of the present invention.

DETAILED DESCRIPTION

The present invention provides a novel fuel product made from spent grain that is processed to change its composition and structure in order to sufficiently increase its combustibility to allow it to be used as a fuel product in accordance with air quality standards and other environmental regulations and law.

In one preferred form of the present invention, the spent grain is primarily malt byproduct of a beer brewing process shown for illustrative purposes only in the drawing. During brewing the grain is first crushed or pulverized by a hammer mill 10 to reduce it to a finely ground median particle size generally within the range of 0.25 mm to 0.6 mm with less than 1% of the grain greater than 2 mm. The preferred, median, particle size between 0.25 mm to 0.6 mm means that fifty percent (50%) of the grain particle mass is greater than and fifty percent (50%) of grain particle mass is smaller than the median size. Pulverizing of the grain reduces the adhesion among the elements of the grain which normally serve to solidify the grain into one cohesive and air-impermeable mass upon combustion. It also increases the surface area of the particles to facilitate the reduction of moisture and increase combustibility. In one preferred form of the present invention, the mill used in this instance is a Meura ClassicMill CLM3 model fine grinding hammer mill with horizontal shaft. This grinding process to obtain the desired particle size, for combustion, can be accomplished before or after the brewing and drying process, prior to combustion. Any other suitable device may be used to pulverize the grain.

After pulverizing, the grain is moved such as by a drag chain conveyor to a mash vessel 12 and hydrated from which it is moved such as by a centrifugal pump to a mash filter press 14 where it is pressed. The latter process reduces its moisture content below 65% and removes soluble sugar and protein contents which act as adhesive during subsequent drying of the spent grain. With these compounds reduced, the tendency of the grain particles to establish cohesion and structural integrity during subsequent drying and burning as a fuel will be significantly reduced. The fact that the spent grain has been pulverized, also enables the filter to be a cloth through which the moisture passes when the spent grain is pressed on the cloth. The latter also reduces the energy needed to further dry the spent grains before its use as fuel. In one preferred process of the present invention, a Meura 2001 mash filter press available in the industry may be used. However other methods and devices may also be used to press the moisture and other soluble compounds from spent grain as described above. Due to the compression of the spent grains to remove moisture, it is preferred that air pulses be directed into the spent grain on the filter cloth before opening the filter to help break up the spent grain cake to facilitate release of the spent grain from binding to the filter cloth when the filter is opened. The spent grain is then moved to a hopper by a pneumatic pump from which it is moved to a grain drying drum 18 by an auger and pulled through the drier drum by a pneumatic fan, for example.

The next step in the process is that the present spent grain is dried to further reduce the moisture content from sixty-five percent (65%) to ten percent (10%) by weight or less. In the preferred embodiment, a rotating dryer drum 18 is used to receive the spent grain and is rotated while heated air in the drum subjects the spent grain to the desired drying while the drum is rotating. The reduced finely ground spent grain particles help speed up the drying process to reach the desired moisture level preferably ten percent (10%) or less by weight in order to increase its combustibility. A suitable dryer drum that can be used is one made by Baker Rullman which is readily available on the market. Other methods of drying the spent grain to sufficiently reduce its moisture content may of course be used. Also, grinding the dried spent grain can be done after the drying process to achieve the desired particle size distribution.

After having been processed as described above, the spent grain can be stored in a hopper 20 for immediate or eventual use as the sole fuel for example in the boiler 22 in a brewery used to produce steam for heating the brew house vessels. In the shown embodiment the dried spent grain is moved to the hopper 20 by a cyclone. Auger 24 is used to convey the spent grain fuel into the combustion chamber 28. For combustion within the boiler 28 the spent grain is moved in any suitable manner preferably down an inclined grate 26 through the combustion chamber 28 while the grate 26 is agitated or vibrated. In one preferred process, a motor 30 connected by linkage 32 to the grate 26 is employed to vibrate the grate as the spent grain is moved through the combustion chamber 28. The timing frequency and intensity of the inclined grate agitation can be controlled and adjusted as needed for best combustion. The angle of the inclined grate being combined with the agitation or vibration of the grate helps to keep the spent grain moving through the combustion chamber while it burns to inhibit cohesion and solidification of its particles. Under normal circumstances, spent grain that has not been processed as described above, when heated tends to form a sponge-like impermeable, cohesive mass which inhibits the transfer of oxygen and heat to the interior of the mass and thereby prevents sufficient combustion and smoke while also causing an excessive buildup of material within the combustion chamber. However the process of the present invention not only sufficiently reduces the moisture and particle size in the spent grain, soluble proteins and sugars which act as binding agents during heating which can inhibit combustion. In addition, the vibration and continual movement of the spent grain through the combustion chamber further breaks up the spent grain into smaller clumps thereby avoiding cohesion of the particles into a non-porous, cohesive mass with insufficient heat transfer and oxygen into the interior of the mass. In one preferred process of the present invention a King Coal combustion chamber may be used. The process of the present invention provides effective combustion of the spent grain to allow it to be used as the sole source of fuel, that is, without the need of combining it with wood, oil, gas, coal or other combustibles.

In another preferred process of the present invention, rather than separating the spent grain particles during combustion by vibrating or agitating the particles through means of the grate 26, linkage 32 and motor 30 as described above, the spent grain particles are separated and disbursed during combustion by being introduced or fed into the combustion chamber by a pneumatic stoker. The latter sprays the spent grain particles into the combustion chamber thereby separating and disbursing the particles and igniting and burning them while they are in suspension and separated from each other and before they can land and adhere to each other on the grate or other bed. This method also increases the oxygen flow and combustion to allow the spent grain to be used as the sole fuel source in brewery boilers.

Although certain specific steps and devices for performing the steps of the process of the present invention have been disclosed above, it will be apparent to one of ordinary skill in the art that other steps and devices may be used without departing from the scope of the present invention indicated in the appended claims. It will also be apparent that the present invention may be applied to grains other than malt which is disclosed for illustrative purposes only. It will also be apparent that the present invention may be applied to other processes other than brewing which is disclosed for illustrative purposes only. For example, in addition to Brewers Spent Grains (termed BDG in the art) described above, the present invention may be applied to Distillers Spent Grain (DDG).

We claim:

1. A process for making a fuel product from spent grain comprising the following steps:
   in a brewing process pulverizing grain to reduce the particles to median particle size generally within the range of 0.25 mm to 0.6 mm with less than one percent (1%) of the grain particles greater than 2 mm,
   after brewing, pressing the spent grain to mechanically remove moisture and other soluble components from the spent grain,
   and drying the spent grain to reduce its moisture content to ten percent (10%) or less by weight and
   further including the step of combusting the spent grain and agitating the spent grain during this combustion phase to separate particles of the spent grain to inhibit their cohesion into an integrated mass, wherein agitation of the spent grain is effected by spraying the spent grain into a combustion chamber, wherein spraying the spent grain is effected by utilizing a pneumatic stoker,
   wherein the process steps recited above renders the spent grain combustible in and of itself as a primary or sole fuel source.

2. The process defined in claim 1 including the step of pressing the spent brewing grains on a filter cloth to remove moisture and other soluble compounds from the spent grain through apertures in the cloth.

3. The process defined in claim 1 including the step of subjecting the grain to a hammer mill to pulverize the grain.

4. The process defined in claim 1 including the step of drying the spent grain in a heated rotating drum.

5. The process defined in claim 1 including the step of applying said process to malt.

6. The process defined in claim 1 including the step of pressing the spent grain on a filter to reduce the moisture in the grain below sixty-five percent (65%).

7. The process defined in claim 2 including the step of directing pulses of air on the spent grains while on the filter cloth after they have been pressed to facilitate removal of the spent grain from the filter cloth.

8. A process of making a combustible fuel product from grain comprising the steps of:
   removing the moisture content of the grain to a value of ten percent (10%) or less,
   reducing the size of the particles of the grain to a size generally within range of 0.25 mm to 0.6 mm, and
   combusting and agitating the grain during combustion phase to separate particles of the grain to inhibit their cohesion into an integrated mass, wherein agitation of the grain is effected by spraying the grain into a combustion chamber, wherein spraying the grain is effected by utilizing a pneumatic stoker, wherein the process steps recited above renders the grain combustible in and of itself as a primary or sole fuel source.

9. The process defined in claim 8, wherein the grain is spent grain from a brewing process, distillers dried grain (DDG) from a distillation process, or grains originating from processes other than malt, brewing or distillation processes.

10. The process defined in claim 9, wherein the moisture content of the grain is reduced to ten percent (10%) or less after the brewing process when the grain is spent.

11. The process defined in claim 9, wherein the size of the grain particles is reduced to generally within said range of 0.25 mm to 0.6 mm during the brewing process.

12. The process defined in claim 9, wherein the grain is spent grain from a brewing process and wherein less than one percent (1%) of the grain particles is greater than 2 mm in size.

\* \* \* \* \*